Aug. 16, 1949.  R. W. LANDON  2,479,172
TURNBARREL CONNECTION
Filed Jan. 17, 1947

Inventor
ROBERT W. LANDON.
By
Attorney

Patented Aug. 16, 1949

2,479,172

UNITED STATES PATENT OFFICE 2,479,172

TURNBARREL CONNECTION

Robert W. Landon, Roscoe, Calif.

Application January 17, 1947, Serial No. 722,730

5 Claims. (Cl. 287—60)

The present invention relates to turnbuckle connections in general and particularly to means to prevent unintended separation of the threaded parts from the barrel. The subject matter herein is a continuation-in-part of that of my copending application, Serial No. 628,046, titled, "Turnbarrel connections" and filed November 13, 1945, which became abandoned June 20, 1947. More specifically, the invention resides in a lock strap which is carried by a barrel and which holds it non-rotatably with respect to the elements secured thereto so as to prevent unintended rotation and separation.

As used herein the term turnbarrel or barrel refers to the oppositely threaded portion of a turnbuckle intermediate the joined terminal portions.

Turnbarrels have long been used to connect two aligned wires or rods at their adjacent ends. The turnbarrel is usually interiorly threaded at each of its ends with threads which are so related that the rotation of the barrel in one direction causes the simultaneous advance or retreat of the threaded ends of the attached elements. In those instances in which a rod of relatively large diameter is used, the end of the rod itself may be threaded and screwed into the turnbarrel. Where rods of small size or wires are to be connected, they are fixed to connectors which are provided with threaded ends adapted to screw into the turnbarrel.

Some turnbuckles are constructed with only one threaded terminal portion, the other being joined to the barrel with a swivel joint to permit relative rotation.

Such constructions are old and well known and have been used extensively in many fields and particularly in airplanes where they perform the very important function of adjusting the length of control cables. On a large airplane as many as two hundred and fifty such connections may be used and, through their ability to draw the cables together, also serve as tension-adjusting means.

As used in airplanes, the turnbarrels usually connect cables which vary in size up to a maximum of about ¼ inch diameter. These cables are initially tensioned with a pull that may vary between fifty and one hundred pounds and the turnbarrels and their connections must be at least as strong as the cables which they connect. In the use of these turnbarrels in many places the problem of preventing their unscrewing and loosening due to vibration is a serious one which has received considerable attention. In aeronautical uses, small diameter safety wires are usually threaded through the turnbarrel and through the terminal elements connected thereto in such manner as to prevent relative rotation. These wires are usually twisted between their points of connection to the various elements to provide maximum strength. Such locking means, however, have the inherent disadvantage that they require appreciable time to install and are exceedingly difficult to remove or inspect where the space is limited. In many instances periodic adjustment of the turnbuckle is desired and in such cases the safety wire must be removed and discarded and a new wire installed after the adjustment has been made. In certain parts of an airplane, in which turnbarrel connections are to be found, the available room is very small and is it difficult for the mechanic to crawl into the space and position the locking wire. Under such circumstances, human error and fatigue have produced unsatisfactory results.

In the turnbuckle connection constructed in accordance with the present invention, a simple and economically produced structure is provided which has maximum strength and which positively prevents unintended separation of the parts. The device is easily positioned and when once connected cannot become dislocated as a result of vibration or other exterior forces acting upon the turnbarrel or upon the cables, wires, or rods.

Accordingly it is an object of the present invention to provide a new and improved turnbarrel connection.

It is another object of the invention to provide new and improved locking means in a turnbarrel connection.

A further object of the invention is to provide a simple and strong locking element for a turnbarrel connection which is easily positioned and secured and which cannot be dislocated by vibration.

It is another object of my invention to provide a locking element which will permit adjustment of the turnbuckle to which it is attached without destroying the locking element or rendering it ineffective.

A still further object of the invention is to provide locking means for a turnbarrel connection which positively prevents the relative rotation of the connected parts of the turnbarrel while positioned in its place.

These and other more specific objects will appear upon reading the following specification and claims and upon considering in connection there-with the attached drawings to which they relate.

Referring now to the drawings, Figure 1 is a top plan view of a turnbarrel connection constructed in accordance with the present invention;

Figure 1:
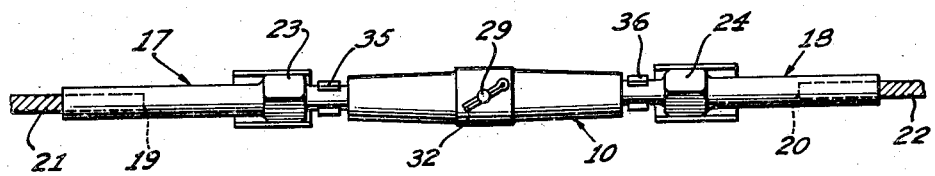

The reference character 10 in the drawings indicates the barrel of a turnbuckle of a common and well known design formed with a longitudinally extending central passageway 11 oppositely threaded upon opposite sides of its midpoint, as indicated at 12 and 13. The turn-barrel 10 is provided with a central enlarged portion through which extends a transverse passageway 14 for a reason which will be explained.

Threaded into the threaded ends 12 and 13 of the barrel are the exteriorly threaded ends 15 and 16 of connectors or swedge elements 17 and 18 which are provided at their outer ends with longitudinally extending cable-receiving bores or cavities 19 and 20 adapted to seat fixedly and non-removably the ends of the cables 21 and 22 which are to be secured together. The cables may be secured within the cavities 19 and 20 in any suitable manner which will positively prevent separation. A preferred method is to crimp or swedge the connectors 17 and 18 upon the cables by the use of tremendous pressure.

Positioned upon connectors 17 and 18 between the ends thereof is a nut-like portion indicated by the reference characters 23 and 24, respectively. These nut-like portions are formed integrally in the connectors 17 and 18 and in a preferred design may be hexagonal although it is to be understood that the exact number of faces is not important so long as there are parallel faces upon the opposite sides of the nut-like portion and they have an appreciable surface. In addition to their function, which will be hereinafter fully set forth, these nut-like portions provide means by which the connectors can be held non-rotatably as the turnbarrel 10 is rotated to advance the threaded ends 15 and 16 toward each other to tension the cables.

Figure 5:
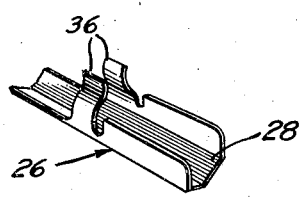
Figure 5 is a partial perspective view of the end of the locking strap illustrated in the foregoing figures.
Figure 4:
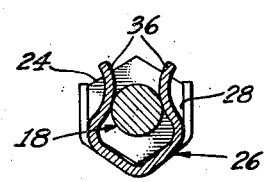
Figure 4 is an elevational section taken on the line 4—4 in Fig. 2.

According to the present invention, a lock strap 26 is provided which comprises an elongated, slightly curved strap-like body which gives the element its name. The body is formed in its extremities with upturned flanges to form seats 27 and 28, the sides of which are spaced a distance equal to or slightly less than the distance separating diametrically opposed parallel faces of the nut-like portions 23 and 24. As can be seen best in Figs. 5 and 6 the seats 27 and 28 are similar in shape and operation to an open end wrench and are installed onto the nut-like portions 23 and 24 from the side in the same manner as such a wrench would be.

An opening is provided in the central portion of the strap 26 and is so positioned as to align with the passageway 14 when the strap is in place on the turnbuckle. When the strap is in place as just described, it is secured to the barrel by means of a bolt or pin 29 which is passed through the aligned openings in the strap 26 and the barrel 10.

Figure 2:
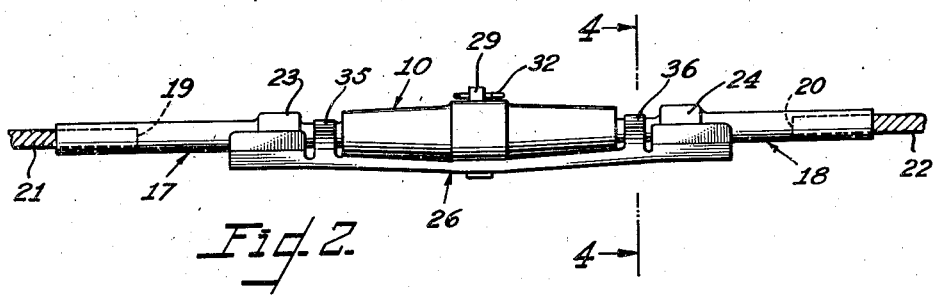
Figure 2 is a side elevation of the construction shown in Fig. 1.
Figure 3:
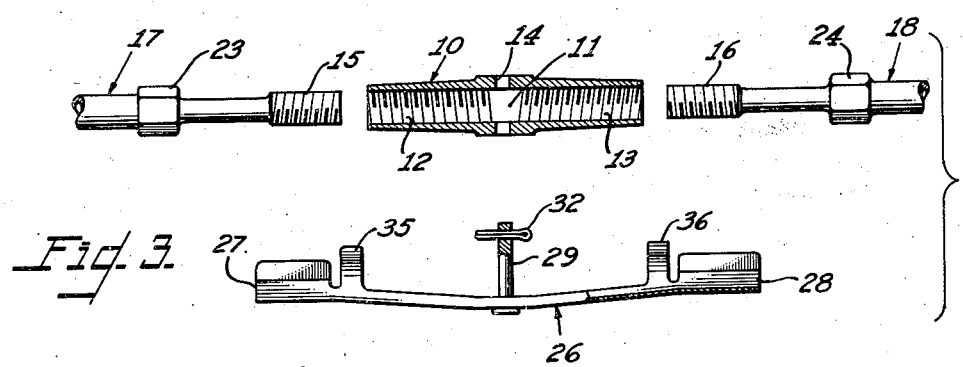
Figure 3 is an exploded view with the lock strap removed from the turnbarrel which is itself shown in section and with the threaded swedge elements spaced therefrom.

In order to further secure the lock strap 26 to the turnbuckle, two pairs of spring clips 35 and 36 are formed in the strap 26, one pair adjacent the inner end of each of the seats 27 and 28. As can be seen best in Figs. 1 and 2 these clips 35 and 36 are positioned and adapted to snap over a necked down circular portion of the connectors 17 and 18. The strap 26 being formed of a relatively resilient material, the spring action of the clips 35 and 36 securely grips the connectors 17 and 18 and holds the seats 27 and 28 in secure engagement with the nut-like portions 23 and 24. Thus the strap is held securely onto the turnbuckle and relative rotation of any of the three parts 17, 10 or 18 is prevented by the cooperative action of the seats 27 and 28 and the securing pin 29.

The securing pin 29 may be in the form of a clevis pin such as that illustrated in the drawings and secured in place by means of a cotter key 32 or alternately a common bolt may be used and a nut provided to hold the bolt in place.

It is to be noted that by removing the pin 29 but leaving the strap 26 in place, the barrel 10 may be rotated while holding the connectors 17 and 18 against rotation.

Thus it is possible by removing a single simple part, the pin 29, to adjust the tension effected by the turnbuckle. When such adjustment has been made, the pin may be reinserted and secured in place thus locking the barrel against further rotation.

The seats 27 and 28 being of considerable longitudinal extent permit full adjustment of the turnbuckle without advancing the nut-like portions 23 and 24 beyond the limit of the seats 27 and 28. Similarly sufficient length of the necked down portion of the end pieces 17 and 18 is provided to permit relative longitudinal movement between the clips 35 and 36 and the end portions 17 and 18.

Figure 6:
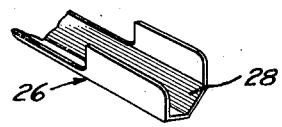
Figure 6 is a perspective view of the end of a modified lock strap.

In some instances where the turnbuckle is to be subjected to relatively low torque, the securing clips 35 and 36 may be dispensed with. In Fig. 6 I have illustrated the appearance of the end of a locking strap without the clip 35.

While the particular apparatus herein shown and described in detail is fully capable of attaining the objects and providing the advantages hereinbefore stated, it is to be understood that it is merely illustrative of the presently preferred embodiment of the invention and the invention is not limited to the details of construction or design herein other than as defined in the appended claims.

I claim:

1. In a turnbuckle, a turnbarrel threaded interiorly at its opposite ends and formed with a transverse passageway, exteriorly threaded elements screwthreaded into the ends of said turnbarrel and formed with polygonal surfaces, and locking means seating against and holding said polygonal surfaces against rotation, said locking means including a member extended through said transverse passageway, and resilient means adapted to be snapped onto, and grip said elements whereby to maintain said seating thereof.

2. In a turnbuckle, a turnbarrel threaded interiorly at its opposite ends and formed with a centrally located transverse passageway, connectors engaged in said turnbarrel, threaded at their ends and formed with nut-like surfaces spaced from said ends, and a lock strap formed at its ends with seats for holding said nut-like surfaces non-rotatably and having intermediate its ends a bolt extended through the transverse passageway of said turnbarrel, and resilient means formed in said strap adapted to be snapped onto, and grip said connectors and hold said seats against said surfaces.

3. In a turnbuckle, a turnbarrel threaded interiorly at its opposite ends and formed with a centrally located transverse passageway, connectors each formed with recessed cable-receiving ends and with opposite screwthreaded ends engaged in said turnbarrel, each of said connectors being formed within its length with a polygonally sectioned portion having diametrically opposed parallel faces, and locking means to prevent unintended relative rotation of said turnbarrel and connectors comprising a body extended between said polygonally sectioned portions of said connectors and formed with seats having parallel sides non-rotatably seating against said portions, a bolt extending from said body through said passageway; and a pair of resilient jaws formed in said body adjacent each of said seats adapted to be snapped onto said connector from a side thereof whereby to grip said connectors and hold said seats thereagainst.

4. A locking strap for a turnbuckle comprising an elongated strap having a transverse central opening, end-wrench-like ends formed therein adapted to engage and non-rotatably hold terminal members of said turnbuckle, spring clip means formed adjacent each of said ends adapted to be snapped onto said terminal members from a side thereof whereby to grip said terminals and hold said wrench-like ends in said engagement; and a transversely disposed pin in said opening and engageable with the barrel of said turnbuckle to prevent rotation thereof.

5. For use with a turnbuckle of the type having a central threaded barrel and a pair of connectors threaded into said barrel, each connector having a cylindrical necked down portion and a polygonal nut-like portion adjacent thereto, a locking member comprising in combination: an elongated strap portion adapted to be non-rotatably secured to said barrel and extend longitudinally parallel to said turnbuckle; a pair of end-wrench-like seats formed in the ends of said strap portion, said seats being positioned and adapted for engagement with said nut-like portions by application from the side of said turnbuckle; and a pair of spring clips, one adjacent each of said seats, each of said clips comprising a pair of resilient jaw members adapted to snap over and grip said necked down portion upon said application of said seats whereby to retain said seats on said nut-like portion.

ROBERT W. LANDON.

REFERENCES CITED

The following references are of record in the file of this patent:

UNITED STATES PATENTS

| Number | Name | Date |
| --- | --- | --- |
| 1,293,383 | Eaton | Feb. 4, 1919 |
| 1,411,279 | Jaynes | Apr. 4, 1922 |
| 2,398,160 | Silver | Apr. 9, 1946 |

FOREIGN PATENTS

| Number | Country | Date |
| --- | --- | --- |
| 522,343 | Germany | Apr. 16, 1931 |